(12) United States Patent
Radermacher et al.

(10) Patent No.: US 8,491,432 B2
(45) Date of Patent: Jul. 23, 2013

(54) DRIVE CONFIGURATIONS FOR HIGH SPEED MOTOR DRIVE SYSTEMS

(75) Inventors: J. Axel Radermacher, Foothill Ranch, CA (US); Paul Boskovitch, Costa Mesa, CA (US)

(73) Assignee: Fisker Automotive, Inc., Anaheim, CA (US)

( * ) Notice: Subject to any disclaimer, the term of this patent is extended or adjusted under 35 U.S.C. 154(b) by 0 days.

(21) Appl. No.: 13/335,816

(22) Filed: Dec. 22, 2011

(65) Prior Publication Data

US 2012/0165147 A1    Jun. 28, 2012

Related U.S. Application Data

(63) Continuation of application No. PCT/US2010/039640, filed on Jun. 23, 2010.

(60) Provisional application No. 61/219,465, filed on Jun. 23, 2009.

(51) Int. Cl.
*F16H 3/72*    (2006.01)

(52) U.S. Cl.
USPC .................................................... 475/5

(58) Field of Classification Search
USPC .......................................... 475/5, 6, 149, 150
See application file for complete search history.

(56) References Cited

U.S. PATENT DOCUMENTS

| | | | |
|---|---|---|---|
| 1,661,780 A * | 3/1928 | Warhus ..................... 180/65.6 |
| 2,570,319 A * | 10/1951 | Cassady ...................... 180/216 |
| 2,844,209 A * | 7/1958 | Brunderman ................ 180/89.1 |
| 3,082,335 A | 3/1963 | De Lancey | |
| 3,117,648 A * | 1/1964 | Landreth ........................ 180/55 |
| 3,648,795 A * | 3/1972 | Moulton ....................... 180/216 |
| 4,161,226 A * | 7/1979 | Warner et al. ............... 180/65.6 |
| 4,418,777 A * | 12/1983 | Stockton ..................... 180/65.6 |
| 4,864,889 A | 9/1989 | Sakakibara et al. | |
| 5,183,444 A | 2/1993 | Robbins | |
| 5,289,890 A * | 3/1994 | Toyoda et al. .............. 180/65.8 |
| 5,372,213 A * | 12/1994 | Hasebe et al. ............... 180/65.6 |
| 5,396,968 A * | 3/1995 | Hasebe et al. ............... 180/65.6 |
| 5,492,189 A * | 2/1996 | Kriegler et al. ............ 180/65.23 |
| 5,620,387 A * | 4/1997 | Janiszewski ................... 475/150 |
| 5,637,048 A * | 6/1997 | Maeda et al. ................ 475/150 |
| 5,759,128 A * | 6/1998 | Mizutani et al. ............. 475/149 |
| 5,807,205 A * | 9/1998 | Odaka et al. .................... 477/29 |
| 6,074,321 A * | 6/2000 | Maeda et al. ................ 475/221 |
| 6,155,364 A * | 12/2000 | Nagano et al. ........... 180/65.235 |

(Continued)

OTHER PUBLICATIONS

International Search Report in PCT/US2010/039640 dated Aug. 19, 2010.

*Primary Examiner* — Dirk Wright
(74) *Attorney, Agent, or Firm* — Foley & Lardner LLP

(57) ABSTRACT

A motor drive system configuration for a hybrid vehicle includes a first motor, a second motor, a differential mounted between the first motor and the second motor, a differential gear, a reduction gear, and a rotatable shaft. The reduction gear includes first end in meshed engagement with the differential gear and a second end. The rotatable shaft includes a first end rotatably coupled to the first motor and a second end rotatably coupled to the second motor. The second end of the rotatable shaft includes a gear in meshed engagement with the second end of the reduction gear. The rotatable shaft has a ninety degree input into the differential and the first and second motors are mounted in-line with the rotatable shaft.

12 Claims, 7 Drawing Sheets

U.S. PATENT DOCUMENTS

| | | | |
|---|---|---|---|
| 6,349,782 B1 * | 2/2002 | Sekiya et al. | 180/65.25 |
| 6,364,806 B1 * | 4/2002 | Spaniel | 477/3 |
| 6,520,879 B2 * | 2/2003 | Kawabata et al. | 475/5 |
| 6,708,788 B2 * | 3/2004 | Kuwayama | 180/65.6 |
| 6,770,005 B2 * | 8/2004 | Aikawa et al. | 475/5 |
| 6,966,866 B2 * | 11/2005 | Ando et al. | 477/4 |
| 7,063,637 B2 | 6/2006 | Yamauchi et al. | |
| 7,115,057 B2 * | 10/2006 | House | 475/5 |
| 7,220,207 B2 * | 5/2007 | Yamamoto | 475/150 |
| 7,240,748 B2 * | 7/2007 | Kira et al. | 180/65.25 |
| 7,261,660 B2 * | 8/2007 | Sowul et al. | 475/5 |
| 7,316,627 B2 * | 1/2008 | Bennett | 475/149 |
| 7,549,940 B2 * | 6/2009 | Kira et al. | 475/204 |
| 7,931,103 B2 * | 4/2011 | Morrow et al. | 180/65.6 |
| 7,990,004 B2 * | 8/2011 | Aikawa et al. | 310/89 |
| 8,142,317 B2 * | 3/2012 | Nagamatsu | 475/5 |
| 2001/0009878 A1 * | 7/2001 | Kaneko et al. | 475/5 |
| 2010/0041502 A1 * | 2/2010 | Nagamatsu | 475/5 |

* cited by examiner

DRIVE CONFIGURATIONS FOR HIGH SPEED MOTOR DRIVE SYSTEMS

CROSS-REFERENCE TO RELATED APPLICATIONS

This application is a Continuation of International Application PCT/US2010/039640, filed Jun. 23, 2010, which was published in English on Dec. 29, 2010 as WO 2010/151579 A1, which claims the benefit of U.S. Provisional Application No. 61/219,465, filed Jun. 23, 2009, all of which are incorporated herein by reference in their entirety.

BACKGROUND

The present disclosure relates generally to a motor drive system. More specifically, the present disclosure relates to drive a configuration for a high speed motor drive system.

DESCRIPTION OF THE RELATED ART

Hybrid electric vehicles (HEV) and full electric vehicles (FEV) use motors to convert electrical energy into kinetic energy. Whereas HEVs combine an internal combustion engine and one or more electric motors, FEVs use electric motors exclusively. Conventional HEV and FEV motors have a number of efficiency and cost issues. For example, conventional HEV and FEV motors require a considerable amount of magnetic material in order to be operational. The required magnetic material increases the mass and cost of the motor significantly.

Thus, there is a need in the art for a drive configuration for a high speed motor drive system that is more efficient and less costly.

SUMMARY

Accordingly, the present disclosure relates to a motor drive system configuration for a vehicle that includes a first motor, a second motor, a differential mounted between the first motor and the second motor, a differential gear, a reduction gear, and a rotatable shaft. The reduction gear includes a first end in meshed engagement with the differential gear and a second end. The rotatable shaft includes a first end rotatably coupled to the first motor and a second end rotatably coupled to the second motor. The second end of the rotatable shaft includes a gear in meshed engagement with the second end of the reduction gear. The rotatable shaft has a ninety degree input into the differential and the first and second motors are mounted in-line with the rotatable shaft.

An advantage of the present disclosure is that a motor drive system for a hybrid vehicle is provided that uses conventional components arranged in a novel manner to improve efficiency of the vehicle. Another advantage of the present disclosure is that the drive configuration enables the use of higher speed motors which are typically less costly while accounting for packaging requirements. Still another advantage of the present disclosure is that the motor drive system enables the use of more compact generators for a given power level. Another advantage of the present disclosure is that the drive configuration reduces motor costs.

Other features and advantages of the present disclosure will be readily appreciated, as the same becomes better understood after reading the subsequent description taken in conjunction with the accompanying drawings.

DESCRIPTION

Figure 1:
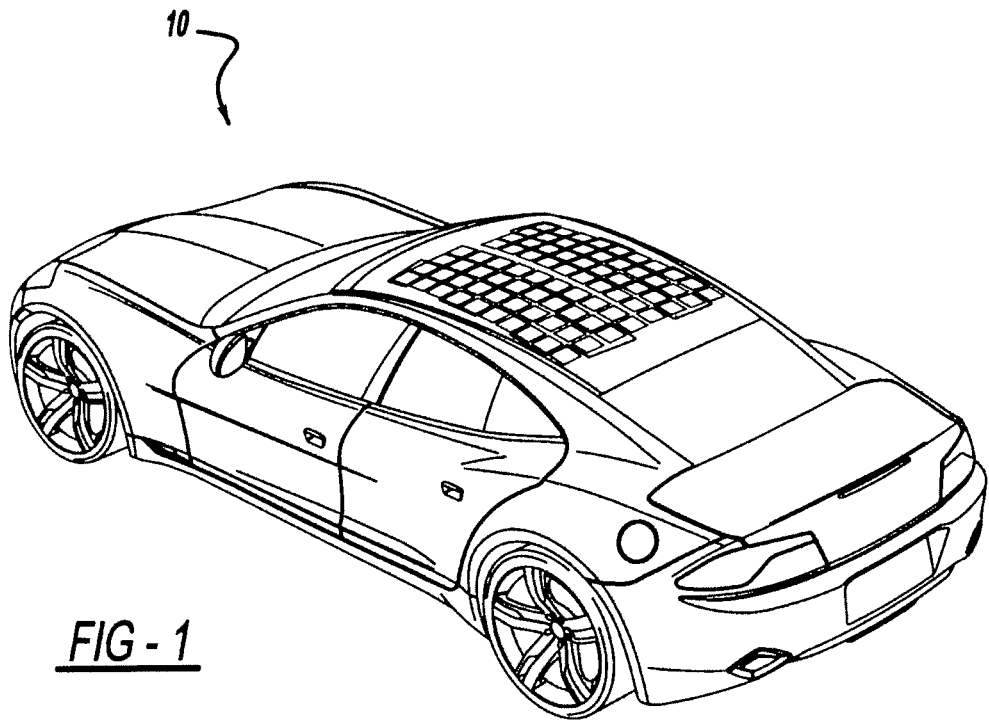
FIG. 1 is a perspective view of a vehicle, according to an exemplary embodiment.

Referring generally to the FIGS. 1-9 and particularly to FIG. 1, a vehicle 10 is illustrated. In this example the vehicle 10 is a plug-in hybrid electric vehicle (HEV) that is electrically powered. The vehicle 10 may be a passenger car, truck, or other type of vehicle having a battery. In another example, the vehicle 10 is a full electric vehicle (FEV).

The vehicle 10 includes a powertrain that controls the operation of the vehicle 10. The powertrain can include various components, such as, engines, transmissions or gear boxes, drive shafts, differentials, electric motors, wheels, or the like. In this example, the powertrain is a plug-in hybrid, and includes an electrically powered motor and motor controller. The vehicle 10 may also include a gasoline powered engine that supplements one or more electric motors when required under certain operating conditions. The electrical energy is stored in an energy storage device, such as the battery. The battery may be a single unit, or a plurality of modules arranged in a predetermined manner, such as in series. Various types of batteries may be used, such as lead acid, or lithium-ion or the like. The battery is contained within a battery case and coupled to the vehicle's frame.

Referring now to FIGS. 2-9, various motor drive system configurations for HEVs, FEVs, or other vehicles are shown. The output of the motor drive system is used to power the vehicle 10, drive the vehicle or wheels of a vehicle, or the like. The motor drive system includes various components, such as, one or more motors, one or more shafts, one or more differentials, a plurality of gears (e.g., an input gear, a pinion gear, a planetary reduction, etc.), one or more axles, or the like. The motor drive system examples described within this disclosure use modifications to current standard parts to minimize design requirements and/or use unique arrangements with configurations that minimize the packaging volume. The greater freedom to select motors independent of motor speed allows for a better motor match for a given type of vehicle which improves vehicle efficiency.

Figure 2:
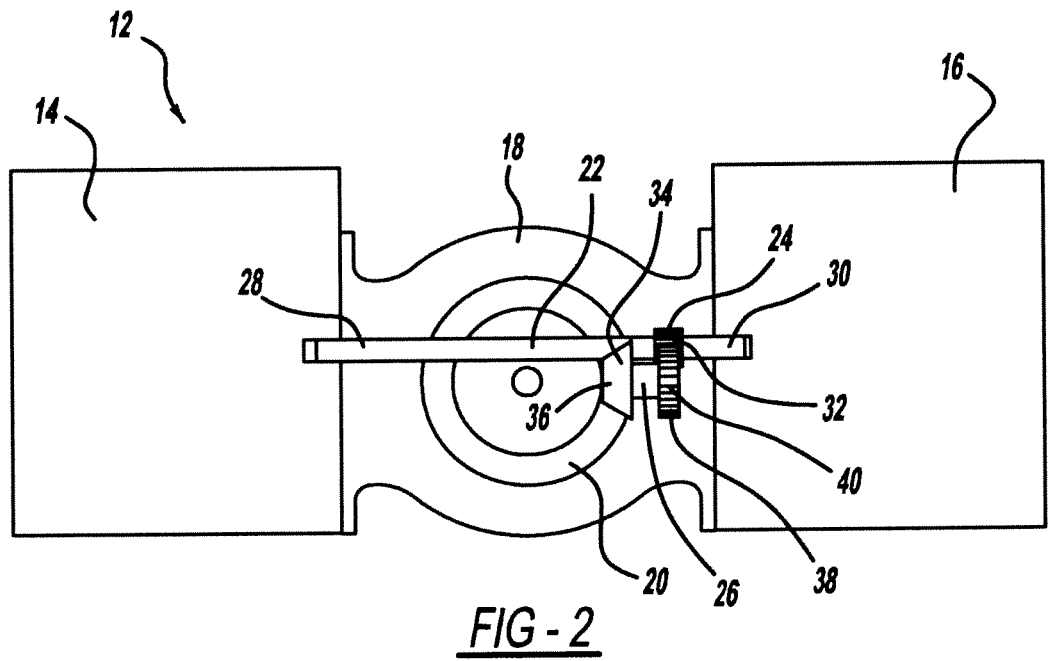
FIG. 2 is a diagram of a motor drive system configuration having two motors and an additional gear reduction, according to an exemplary embodiment.

Referring now particularly to FIG. 2, a motor drive system configuration 12 including a first and second motor 14, 16, a transmission or gearbox 18 having at least one gear or differential 20, a shaft 22 (rotatable shaft) having a first gear 24 (input gear or shaft gear), and a second gear (an additional gear reduction, such as, a pinion gear) 34, and a third gear 38 is shown. The shaft 22 includes a first end 28 operatively (rotatably) coupled to the first motor 14 and a second end 30 operatively (rotatably) coupled to the second motor 16. The transmission or gearbox 18 and differential 20 are positioned between the first motor 14 and the second motor 16. The first gear 24 includes a plurality of teeth 32 and is located on the second end of the shaft 30. The first gear 24 can be concentrically mounted to and integrated with the shaft 22. The second gear (pinion gear) 34 includes a plurality of gear teeth 36 and is connected by a gear shaft 26 to a third gear 38 having a plurality of gear teeth 40. The teeth of the first gear 32 are in meshed engagement with the third gear 38 and in particular, to the teeth of the third gear 40. The teeth of the second gear (pinion gear) 36 are in meshed engagement with the gear(s) of the transmission (gearbox) 18 or differential 20. Under this configuration, there is a ninety degree input into the differential 20. This configuration allows for additional gear reductions to be included. For example, additional gears may be incorporated between the input gear 24 and the pinion gear 26. The additional gear reductions allow for a higher overall ratio between input shafts and output shafts. This allows for high speed motors to be used in conjunction with conventional differential gears with only minimum modifications to the original gear set. Whereas typical speed reductions utilize a relatively low ratio, such as, 2:1 to 4:1, using high speed motors requires a speed reduction on the order of 7:1 or 12:1 and a motor drive system configuration that can accommodate such speed reductions, such as the motor drive system configuration shown in FIG. 2.

Figure 3:
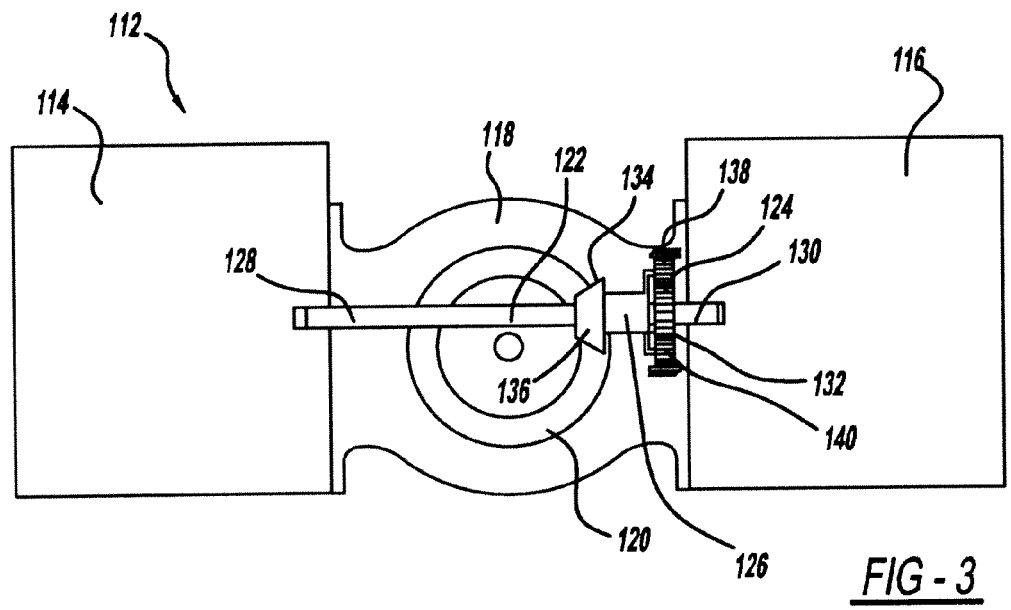
FIG. 3 is a diagram of an alternate motor drive system configuration having two motors and a planetary rear reduction, according to an exemplary embodiment.

Referring now to FIG. 3, an alternate embodiment of a motor drive system configuration 112 is shown. The motor drive system configuration 112 includes a first and second motor 114, 116, a transmission 118 having at least one gear or differential 120, a shaft (rotatable shaft) 22, a first gear 124, a second gear 134, and a planetary gear set (third gear) 138. The shaft 122 includes a first end 128 operatively (rotatably) coupled to the first motor 116 and a second end 130 operatively (rotatably) coupled to the second motor 116. The transmission or gearbox 118 and differential 120 are positioned between the first motor 114 and the second motor 116. The first gear 124 includes a plurality of teeth 132 and is located on the second end of the shaft 130. The first gear 124 can be concentrically mounted to and integrated with the shaft 122. The second gear 134 includes a plurality of teeth 136 and is connected by a gear shaft (carrier for the planet gears) 126 to the planetary gear set 138 having a plurality of teeth 140. The teeth of the first gear 132 are in meshed engagement with the planetary gear set 138 and in particular, to the teeth of the planetary gear set 140 wherein the gear shall 126 acts as a carrier. The teeth of the second gear 134 are in meshed engagement with the gear(s) of the differential 120. This configuration 112 allows for a gear 124 (e.g., input gear, pinion gear, or the like) to be in-line with the motor shafts 122 using another gear 138 (e.g., a planetary gear reduction, or the like). The additional reductions allow for a higher overall ratio between the input shaft and the output shafts. This allows for high speed motors 114, 116 to be used in conjunction with conventional differential gears with only minimum modifications to the original gear set.

Figure 4:
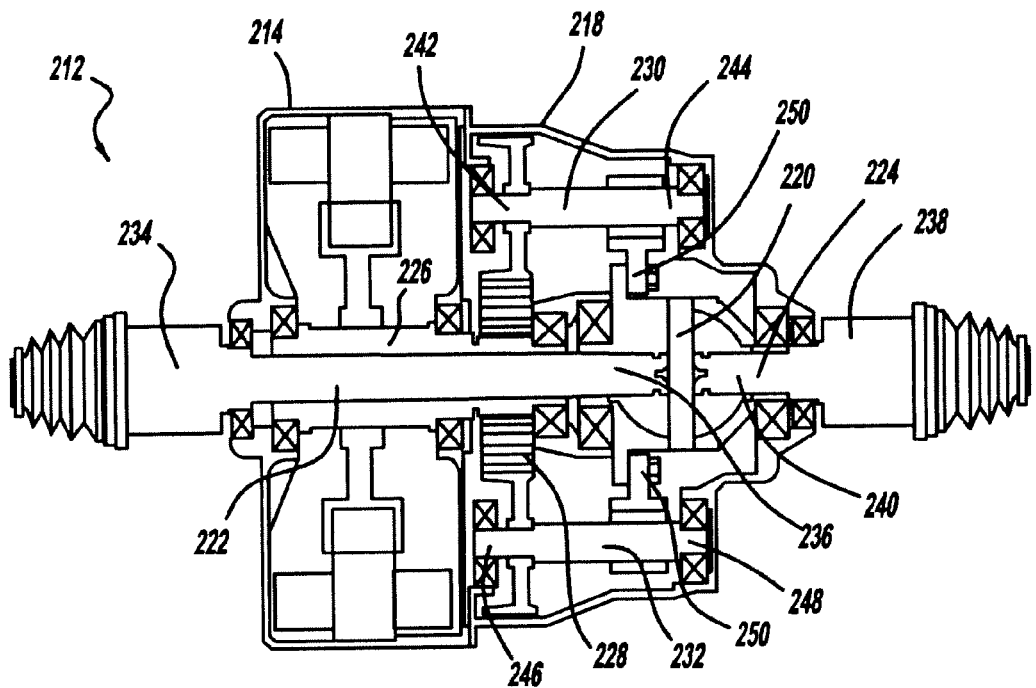
FIG. 4 is a cross-sectional view of an alternate motor drive system configuration having a single motor mounted in-line with the axle and output shafts, according to an exemplary embodiment.

Referring now to FIG. 4, an alternate embodiment of a motor drive system configuration 212 is shown. The motor drive system configuration 212 includes a first motor 214, a transmission or gear box 218, a differential 220, a first independent output shaft 222, a second independent output shaft 224, a first motor shaft 226 having a first end and a second end having a first motor output gear 228, a first counter shaft (e.g., rotating spline shaft, or the like) 230, a second counter shaft (e.g., rotating spline shaft, or the like) 232, and a plurality of additional components, such as, bearings for supporting shafts, fasteners (bolts, screws, or the like) for coupling components together, or the like. The first motor 214 is positioned adjacent the transmission 218. The first motor shaft 226 extends through the motor 214 such that the second end and the first motor output gear 228 extend into the transmission 218. The first independent shaft 222 is an independent through shaft to the first motor shaft 226 and includes a first end 234 having a cover member for attachment to a wheel and a second end 236 coupled to and in operative engagement with the transmission 218 and the differential 220. The second independent shaft 224 includes a first end 238 having a cover member for attachment to a wheel and a second end 240 coupled to and in operative engagement with the transmission 218 and the differential 220. The first and second independent shafts 222, 224 have a predetermined length. In this embodiment, the first independent shaft 222 is longer than the second independent shaft 224—it is contemplated, however, that the shafts 222, 224 can be of equal or unequal in length depending on the motor drive system configuration. The first counter shaft 230 includes a first end 242 in operative engagement with the motor output gear 228 and a second end 244 in operative engagement with a first gear 250 of the differential 220. The second counter shaft 232 includes a first end 246 in operative engagement with the motor output gear 228 and a second end 248 in operative engagement with the first gear 250 of the differential 220. The first motor 214 is mounted in-line with the axle and output shafts 222, 224. This configuration 212 enables the motor 214 to be mounted in-line with the axle and output shafts 222, 224 which improves packaging. This configuration 212 is also advantageous because it enables a higher reduction in speed between the motor 214 and the output shafts 222, 224. Moreover, this configuration 212 also reduces packaging space and therefore reduces costs because the motor 214 does not need to be mounted in an offset manner. Although two countershafts 230, 232 are included, one or more may be included.

Figure 5:
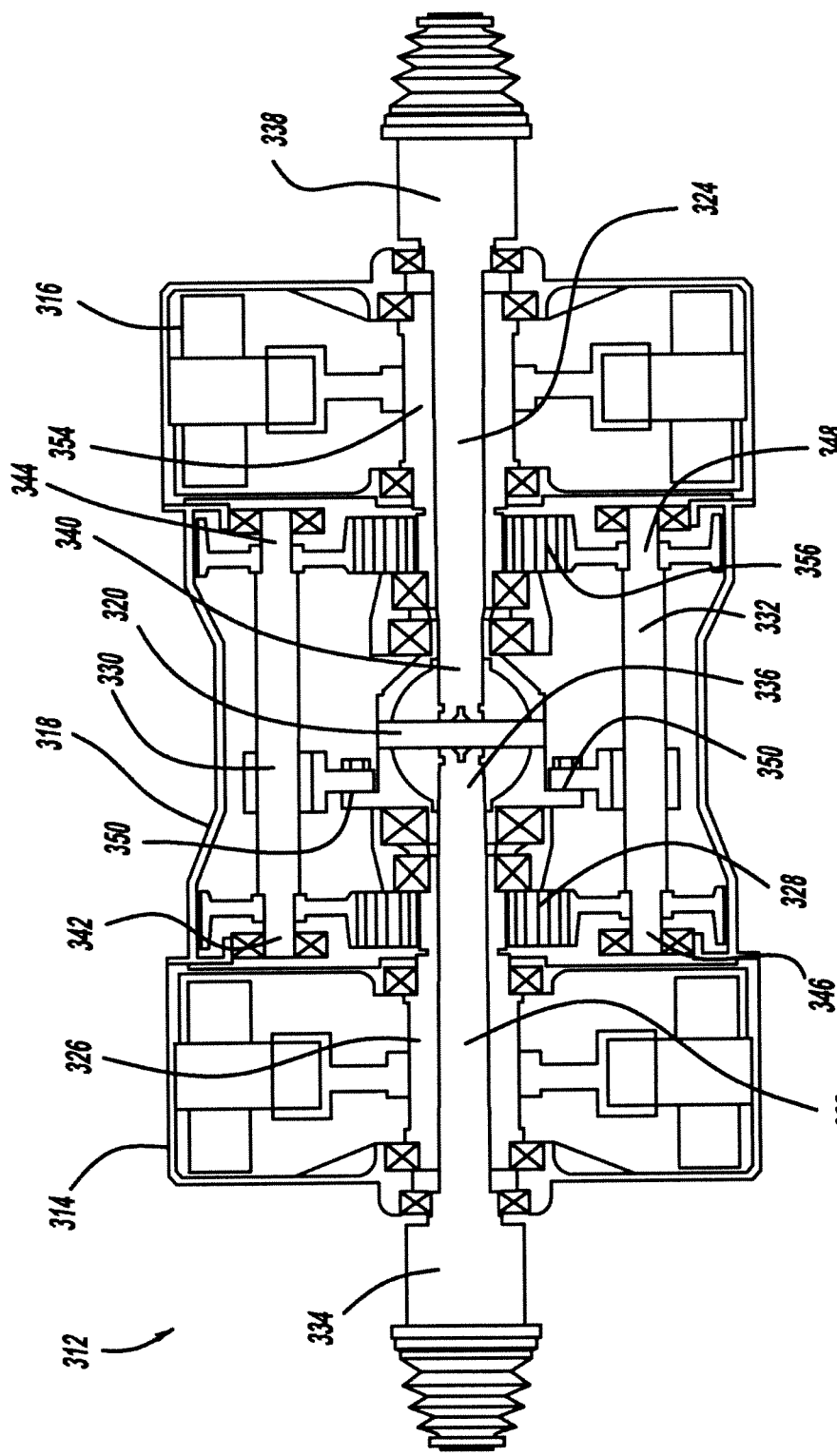
FIG. 5 is a cross-sectional view of an alternate motor drive system configuration having two motors mounted in-line with the axle and output shafts, according to an exemplary embodiment.

Referring now to FIG. 5, an alternate embodiment of a motor drive system configuration 312 is shown. The motor drive system configuration 312 includes a first motor 314, a second motor 316, a transmission or gear box 318, a differential 320, a first independent output shaft 322, a second independent output shaft 324, a first motor shaft 326, a first motor output gear 328, a second motor shaft 254, a second motor output gear 256, a first counter shaft 330, and a second counter shaft 332. The transmission or gearbox 318 is positioned between the first motor 314 and the second motor 316. The first independent shaft 322 includes a first end 334 having a cover member for attachment to a wheel and a second end 336 coupled to and in operative engagement with the transmission 318 and the differential 320. The second independent shaft 324 includes a first end 338 having a cover member for attachment to a wheel and a second end 340 coupled to and in operative engagement with the transmission 318 and the differential 320. The first counter shaft 330 includes a first end 342 in operative engagement with the first motor output gear 328 and a second end 344 in operative engagement with the second motor output gear 356. The second counter shaft 332 includes a first end 346 in operative engagement with the first motor output gear 328 and a second end 348 in operative engagement with the second motor output gear 356. The first and the second counter shafts 330, 332 are also in operative engagement with the first gear 350 of the differential 320. The first and second counter shafts 330, 332 work in tandem to enhance bearing load. The first and second motors 314, 316 are mounted in-line with the axle and output shafts 322, 324. This configuration allows for a second motor to be added if more power to the wheels is necessary or desirable. The motors 314, 316 are mounted in-line to also reduce the effected packaging space which thereby reduces costs. This configuration 312 also provides for even left-right spacing with the differential 320 positioned substantially in the center of the motor drive system 312 which increases modularity. This results in even weight distribution to further enhance packaging space and reduce costs. Moreover, the output shafts (from differential) 322, 324 can be the same—if the differential 320 is not in the center, then two different output shafts would be required and this would therefore increase costs.

Figure 6:
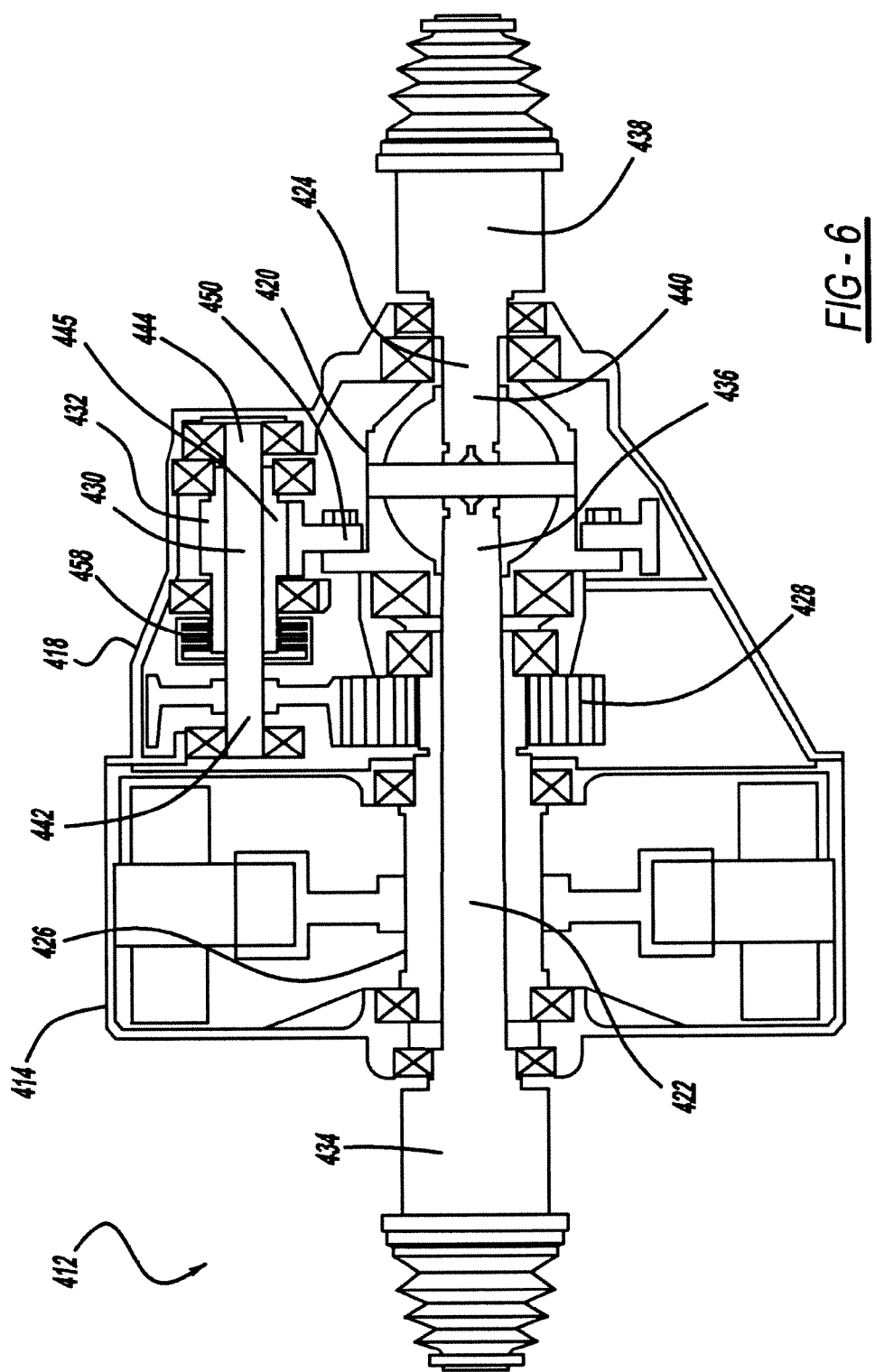
FIG. 6 is a cross-sectional view of an alternate motor drive system configuration having a clutch and a single counter shaft, according to an exemplary embodiment.

Referring now to FIG. 6, an alternate embodiment of a motor drive system configuration 412 is shown. This motor drive system configuration 412 includes a first motor 414, a transmission or gear box 418, a differential 420, a first independent output shaft 422, a second independent output shaft 424, a motor output gear 428, a first counter shaft 430, a hollow second counter shaft 432, and a first clutch 458. The transmission or gearbox 418 is positioned adjacent the first motor 414. The first independent shaft 422 includes a first end 434 having a cover member for attachment to a wheel and a second end 436 coupled to and in operative engagement with the transmission 418 and the differential 420. The second independent shaft 424 includes a first end 438 having a cover member for attachment to a wheel and a second end 440 coupled to and in operative engagement with the transmission 418 and the differential 420. The first counter shaft 430 includes a first end 442 in operative engagement with the motor output gear 428 and a second end 444 that can be selectively engaged or disengaged from operative engagement with a first gear 450 of the differential 420 via the clutch 458. The first counter shaft 430 extends through the hollow second counter shaft 432. The second counter shaft 432 includes one or more gears 445 in contact (e.g., meshed engagement) with the first gear 450. The clutch 458 couples and decouples the first counter shaft 430 with the second counter shaft 432 to thereby engage or disengage the first counter shaft 430 with the first gear 450 of the differential 420. This configuration 412 allows for the clutch 458 to be included which operates to selectively engage and disengage (join or separate, turn on or off, couple or decouple, etc.) the motor 414 from the wheels to reduce efficiency losses when the motor 414 is not needed and/or desired. Engaging the clutch 458 enables the motor 414 to be disconnected from the wheels when required or desirable to thereby improve vehicle efficiency. This configuration 412 may be particularly useful if it is used in a particular drive system where the motor can be disconnected from the wheels to reduce drag which, in turn, would increase vehicle efficiency. For example, this configuration could be used as the front wheel drive unit on a part-time wheel drive vehicle (e.g., part-time 4WD, 2-wheel drive mode, etc.).

Figure 7:
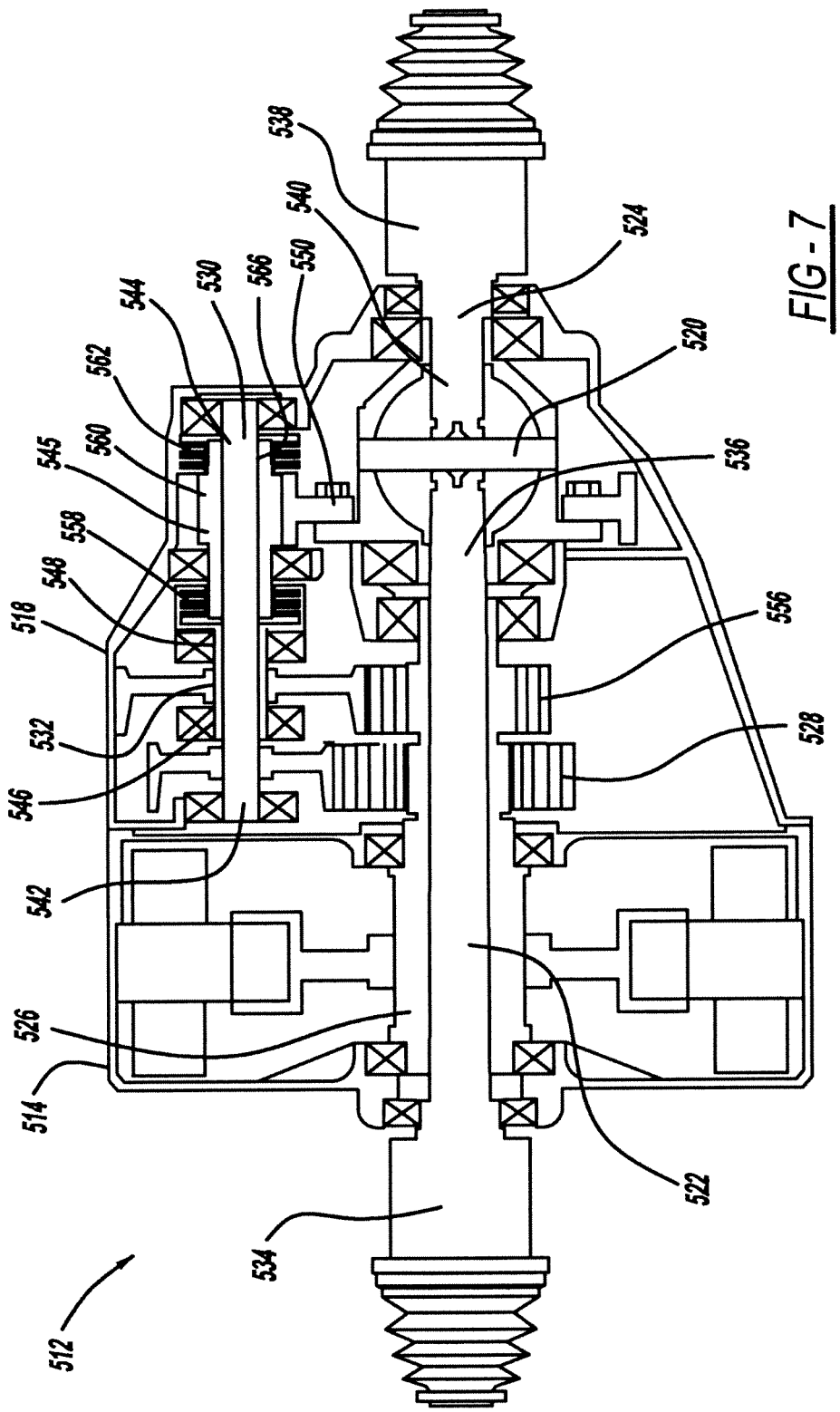
FIG. 7 is a cross-sectional view of an alternate motor drive system configuration having multiple gears, clutches and counter shafts, according to an exemplary embodiment.

Referring now to FIG. 7, an alternate embodiment of a motor drive system configuration 512 is shown. This motor drive system configuration 512 includes a first motor 514, a transmission or gear box 518, a differential 520, a first independent output shaft 522, a second independent output shaft 524, a first motor shaft 526, a first motor output gear 528, a second motor output gear 556, a first counter shaft 530, a hollow second counter shaft 532, a hollow third counter shaft 560, a first clutch 558, and a second clutch 562. The transmission or gearbox 518 is positioned adjacent the first motor 514. The first independent shaft 522 includes a first end 534 having a cover member for attachment to a wheel and a second end 536 coupled to and in operative engagement with the first and second motor output gear 528, 556, the transmission 518 and the differential 520. The second independent shaft 524 includes a first end 538 having a cover member for attachment to a wheel and a second end 540 coupled to and in operative engagement with the transmission 518 and the differential 520. The first counter shaft 530 extends through second counter shaft 532 and the third counter shaft 560. The first counter shaft 530 includes a first end 542 in operative engagement with the first motor output gear 528 and a second end 544 that can be selectively engaged or disengaged from the third counter shaft 560 via the second clutch 562. The second counter shaft 532 includes a first end 546 and a second end 548 and is in operative engagement with the second motor output gear 556. The second end of the second counter shaft 548 is in operative engagement with the first clutch 558 which couples and decouples the second counter shaft 532 and the third counter shafts 560. The third counter shaft 560 includes a first end 564 and a second end 566 having one or more gears 545 which are in operative engagement with the gear 550 of the differential 520. The third counter shaft 560 also includes a plurality of gears 545 in contact (e.g., meshed engagement) with the first gear 550. The first end of the third counter shaft 564 is in operative engagement with the first clutch 558 which couples and decouples the second counter shaft 532 to the third counter shaft 560. The second end of the third counter shaft 566 is in operative engagement with the second clutch 562 which couples and decouples the first counter shaft 530 to the third counter shaft 566. This configuration 512 enables the motor 514 to be disconnected from the wheels when it is not needed and enables a multi-speed transmission (such as, a two-speed, or the like) to be included. This improves vehicle efficiency and enables much greater versatility and options when selecting motor configurations and technologies which further improve cost and efficiency. This configuration 512 also enables the motor drive system 512 to act as two speed transmission. The first and second clutch 558, 562 engage the shaft 560 having an integrated gear 550 which drives the differential 520 and thereby the wheels. The first counter shaft 530 may be engaged to either the second shaft 532 and/or the third shaft 560 depending on driving requirements. The first and second shafts 530, 532 spin at different speeds because both are driven by the motor shafts by different gear sizes 528, 556. Although only two gears 528, 556 are shown, additional gears may be added as needed and/or desired. This could be done by adding another shaft (with the associated clutches and shafts) that is driven by different gear combinations.

Figure 8:
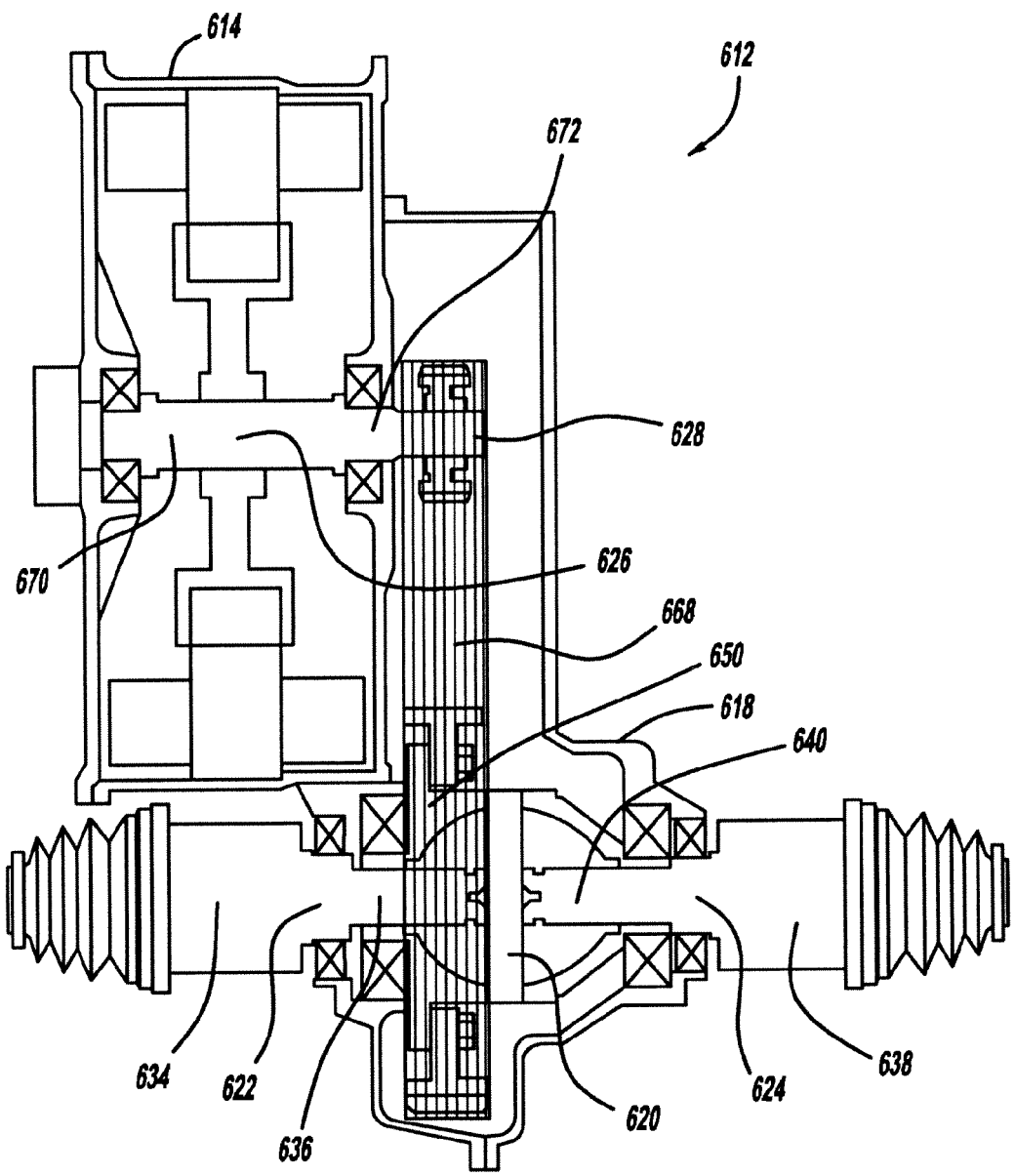
FIG. 8 is a cross-sectional view of an alternate motor drive system configuration having a motor coupled to a differential via a chain member, according to an exemplary embodiment.

Referring now to FIG. 8, an alternate embodiment of a motor drive system configuration 612 is shown. This motor drive system configuration 612 includes a first motor 614, a transmission or gear box 618, a differential 620, a first independent output shaft 622, a second independent output shaft 624, a motor shaft 626, a motor gear 628, and a connecting member 668. The transmission or gearbox 618 is positioned adjacent the first motor 614. The first independent shaft 622 includes a first end 634 having a cover member for attachment to a wheel and a second end 636 coupled to and in operative engagement with the transmission 618 and the differential 620. The second independent shaft 622 includes a first end 638 having a cover member for attachment to a wheel and a second end 640 coupled to and in operative engagement with the transmission 618 and the differential 620. The motor shaft 626 includes a first end 670 and a second end 672 extending from the motor 614. The second end 672 includes the motor gear 628, such as, a sprocket or the like which is coupled to the connecting member 668. The connecting member 668 is an elongated and continuous loop member, such as, a chain, a belt, or the like. The connecting member 668 couples the motor gear 628 to a gear 650 of the differential 620 such that the motor gear 628 and the gear 650 of the differential 620 are in operative engagement with one another. Connecting the motor 614 to the differential 620 via the connecting member 668 enables further versatility and options to the motor drive system configuration 612. For example, this configuration 612 allows for offsetting the motor 614 using the connecting member 668 if the motor 614 cannot be mounted in-line with the axle because of particular constraints/restrictions, such as, motor size restrictions, space restrictions, or the like. For example, if the diameter of the motor is too large, the motor may be offset and coupled to the differential using a chain member.

Figure 9:
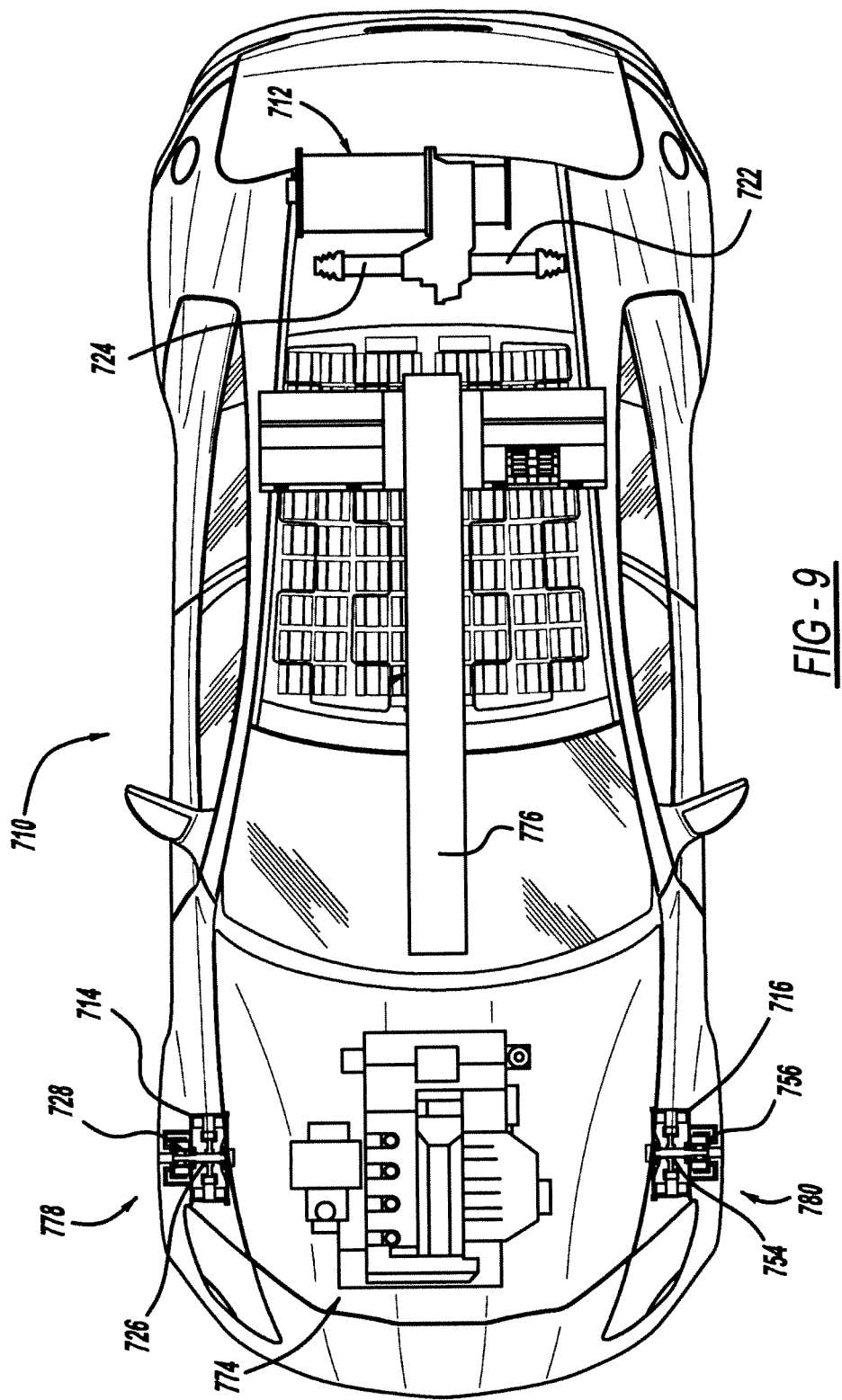
FIG. 9 is a top view of a vehicle having a pair of front at wheel motors and a rear wheel drive motor, according to an exemplary embodiment.

Referring now to FIG. 9, a vehicle 710 having hybrid powertrain architecture is shown. The vehicle 710 includes a first wheel motor (in wheel motor, at wheel motor, or the like) 714, a second wheel motor (or an at wheel motor) 716, an engine 774, a battery 776, and a drive motor 712. The first wheel motor 714 and the second wheel motor 716 are mounted to (or at, near, adjacent, or the like) to the first and second front wheels 778, 780, respectively, by a shaft. The first wheel motor 714 and the second wheel motor 716 include a motor shaft 726, 754 having one or more gears 728, 756, such as, a planetary gear, or the like. This arrangement allows for a relatively high motor speed and a relatively low speed wheel. The first wheel motor powers and drives the front driver side wheel of the vehicle and the second wheel motor powers and drives the front passenger side wheel of the vehicle. The drive motor 712 is positioned at the rear of the vehicle 710 to power the rear vehicle wheels. Although a two wheel motors are shown, any number of wheel motors (such as, an in wheel motor, an at wheel motor, or the like) may be used to power and drive the front and/or rear wheels. Moreover, any one or combination of the motor drive system configurations of the present disclosure may be used in any type of vehicle (e.g., HEV, FEV, etc.) and with any type of powertrain architecture (e.g., series rear wheel drive (Series RWD), series all wheel drive (Series AWD), all wheel drive parallel (AWD Parallel), etc.). This arrangement also eliminates the need for a through shaft between the front wheels for a 4 wheel drive vehicle which reduces costs and packaging space.

The foregoing designs shown and discussed may be modified with additional gears, ratios, speeds and/or incorporated with other solutions, components, or the like. They may also be mounted in any configuration and coupled together using any known techniques.

Many modifications and variations of the present disclosure are possible in light of the above teachings. Therefore, within the scope of the appended claim, the present disclosure may be practiced other than as specifically described.

What is claimed is:

1. A motor drive system configuration for driving a hybrid vehicle, the motor drive system comprising:
   a first motor;
   a second motor;
   a differential mounted between the first motor and the second motor, the differential having a differential gear;
   a rotatable shaft having a first end rotatably coupled to the first motor and a second end rotatably coupled to the second motor, the rotatable shaft having a first gear; and
   a gear shaft having a second gear and a third gear, the third gear operatively engaged with the first gear, the second gear operatively engaged with the differential gear; and
   wherein the third gear is a planetary gear concentrically coupled to the rotatable shaft and the rotatable shaft is engaged with the differential at 90 degrees.

2. The motor drive system configuration of claim 1, wherein the first motor and the second motor are high speed electric motors.

3. The motor drive system configuration of claim 1, wherein the first motor and the second motor are mounted in-line with the rotatable shaft.

4. The motor drive system configuration of claim 1, wherein the first gear is concentrically integrated with the rotatable shaft.

5. The motor drive system of configuration claim 1, wherein the second gear is a pinion gear.

6. The motor drive system configuration of claim 1, wherein the second gear and the third gear include a speed reduction ratio of one of 8:1 and 10:1.

7. The motor drive system configuration of claim 1, wherein the second gear and the third gear include a speed reduction ratio between 7:1 and 12:1.

8. A motor drive system configuration for driving a hybrid vehicle, the motor drive system comprising:
   a transmission including a differential having a gear;
   a first motor mounted to the transmission and including a motor shaft having a first end and a second end, the second end having a first motor output gear, wherein the motor shaft extends through the first motor and into the transmission such that the second end is within the transmission;
   a first output shaft extending through the first motor shaft and into the transmission, the first output shaft having a first end and a second end, the second end rotatably coupled to the differential;
   a second output shaft extending into the transmission, the second output shaft having a first end and a second end, the second end rotatably coupled to the differential; and
   a first counter shaft having a first end in operative engagement with the first motor output gear and a second end in operative engagement with the differential gear;
   a second counter shaft operatively coupled to the differential gear; and
   a clutch coupled to the first counter shaft and the second counter shaft;
   wherein the second end of the first counter shaft extends through the second counter shaft and the clutch selectively couples and decouples the first counter shaft from the second counter shaft; and
   wherein the first motor is mounted in-line with the first and second output shafts.

9. The motor drive system configuration of claim 8, wherein the first motor is a high speed electric motor.

10. The motor drive system configuration of claim 8, further comprising a third counter shaft having a first end in operative engagement with the first motor output gear and a second end in operative engagement with the differential gear.

11. The motor drive system configuration of claim 8, further comprising a second motor mounted to the transmission and including a second motor shaft having a first end and a second end having a second motor output gear, wherein the second motor shaft extends through the second motor and into the transmission such that the second end is within the transmission, the second output shaft extends through the second motor shaft and into the transmission, the second output shaft having a first end and a second end rotatably coupled to the differential.

12. The motor drive system configuration of claim 8, the first output shaft having a length dimension different than a length dimension of the second output shaft.

\* \* \* \* \*